Nov. 11, 1958  J. R. PARSONS  2,859,757
PIPELINE MONITORING AND CONTROL
Filed Dec. 14, 1953  5 Sheets-Sheet 5

INVENTOR.
J. R. Parsons
BY
ATTORNEYS

United States Patent Office 2,859,757
Patented Nov. 11, 1958

2,859,757

PIPELINE MONITORING AND CONTROL

James R. Parsons, Bartlesville, Okla., assignor to Phillips Petroleum Company, a corporation of Delaware Application December 14, 1953, Serial No. 398,021

12 Claims. (Cl. 137—2)

This invention relates to pipeline monitoring and control. In one of its more specific aspects it relates to a method for controlling the flow of fluids through pipelines whereby fluids of different compositions are directed automatically to preselected storage tanks. In another of its more specific aspects, it relates to apparatus, comprising a color monitor and a dielectric properties measuring instrument, which is especially adapted for use in differentiating between batches of petroleum liquids flowing through pipelines. In still another of its more specific aspects, it relates to a method for monitoring a pipeline system through which batches of natural gasoline and crude oil flow.

It is a common practice in the petroleum industry to utilize the same pipelines in order to transport crude oil and finished products. When operating pipelines in this manner, it becomes necessary to provide some means for controlling the flow of liquids therethrough so that a changeover can be made from one type of petroleum liquid to another with substantially no contamination of either type. A standard method for determining the position of the batch head as well as the spread of contamination in product systems is by measurement of the gravity with a hydrometer of samples withdrawn from the line. Another method for pipeline monitoring employs the color comparison technique whereby color changes in samples withdrawn from the pipeline are noted and cut points determined in accordance therewith. In the case of fluids which are colorless or of the same color, a plug of colored dye can be inserted between batches and control established by color comparison. The determination of cut points between different batches of petroleum liquids by the gravity method or the color comparison method does not provide the sensitivity of control or the automatic control desirable in pipeline operation.

Another method which has been advanced for pipeline control involves the measurement of the dielectric properties of the liquid stream. A change in the dielectric properties is indicative of a change in the liquid flowing through the pipeline, and by noting such changes cut points of successive batches can be determined. While this latter method for determining cut points may be effective for certain streams, it does not provide the sensitivity desired when utilizing a pipeline to transport crude oil and natural gasoline. In accordance with the present invention, an instrumentation is provided which makes possible sensitive control over pipelines transporting crude oil and natural gasoline with substantially no contamination of either petroleum liquid.

The following objects of the invention will be attained by the various aspects of the invention.

It is an object of the present invention to provide instrumentation for pipeline monitoring and control.

Another object is to provide a method for controlling the flow of fluids through pipelines whereby fluids of different compositions are automatically directed to preselected storage tanks.

A further object is to provide apparatus, comprising a color monitor and a dielectric properties measuring instrument, for detecting changes in batches of petroleum liquid flowing through pipelines.

Still another object is to provide a method for monitoring a pipeline system utilized to transport natural gasoline and crude oil.

Still other objects and advantages and features of the invention will become apparent from the following disclosure.

In accordance with the present invention, a color monitor and an instrument for measuring the dielectric properties of a material are used in conjunction with one another to meet the separation requirements involved when transporting natural gasoline and crude oils through a pipeline. A switching system is provided which automatically directs the natural gasoline into one tank, natural gasoline contaminated with crude oil into a second tank and crude oil into a third tank. The color monitor makes the fine distinction between clear natural gasoline (Saybolt 30) and off-color natural gasoline (below Saybolt 20) and provides for the necessary transfer from the clean tank to the dirty natural gasoline tank or vice versa. The dielectric properties measuring instrument makes a less critical distinction between crude and dirty natural gasoline and provides automatic transfer from the dirty natural gasoline to the crude tank or vice versa. The dielectric properties measuring instrument also operates to protect the color monitor optical system during crude runs by closing appropriate valves which prevent crude from flowing through the color monitor sample cell.

A more complete understanding of the invention may be obtained by reference to the following description and the drawing, in which.

Figure 1:
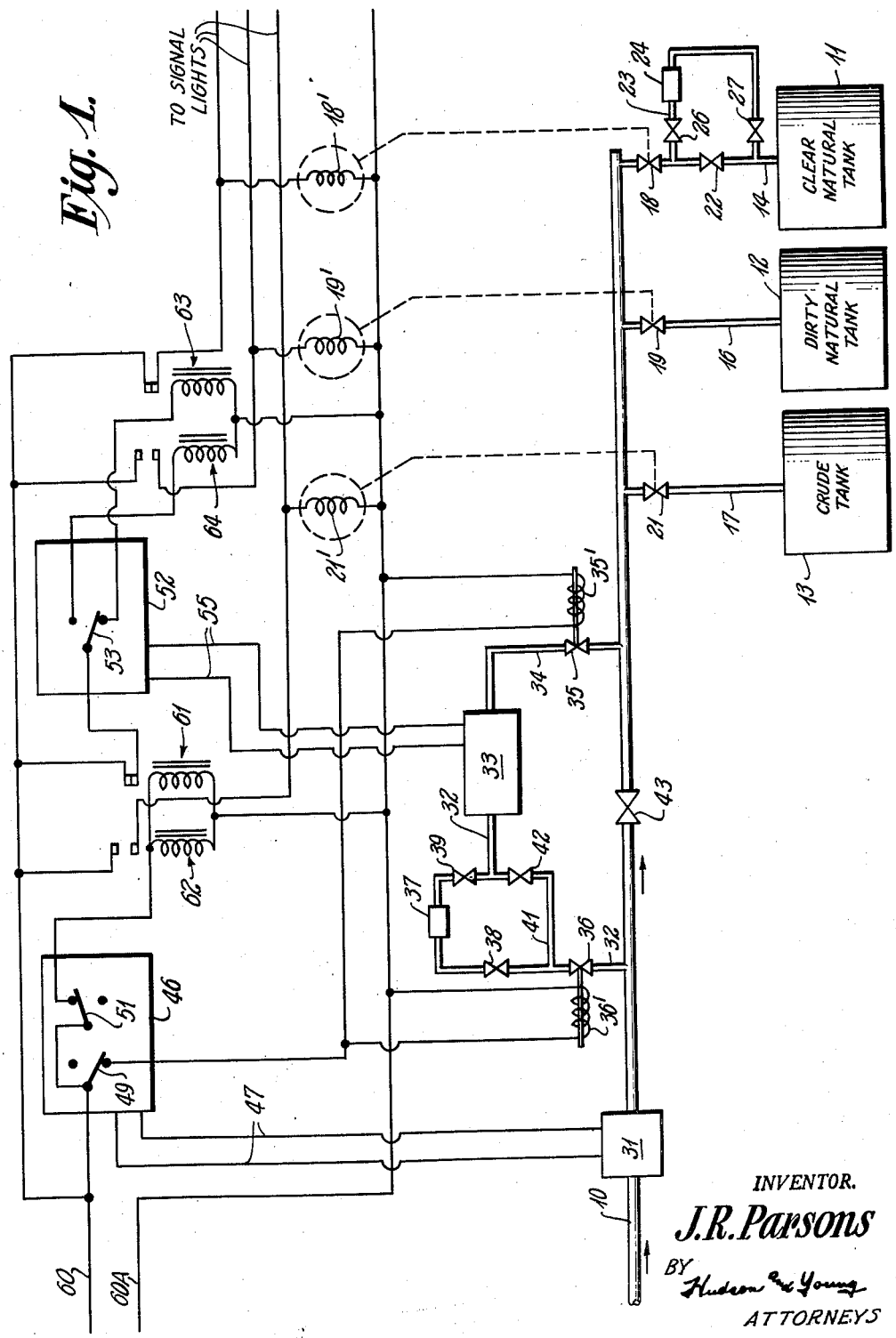
Figure 1 is a schematic wiring and piping diagram of appartus embodying the invention.

Referring now to the drawing and particularly to Figure 1, a pipeline 10 is shown as leading to three storage tanks, namely, a clear natural gas tank 11, a dirty natural gas tank 12 and a crude oil tank 13. Lines 14, 16 and 17 connect line 10 to tanks 11, 12 and 13, respectively, and each of the connecting lines contains a flow control means such as a motor valve designated by reference numerals 18, 19 and 21. The motor valves as shown are spring operated, being in a closed position at all times except when their respective field coils 18', 19' and 21' are energized. Line 14 is additionally provided with a valve 22 around which line 23 is connected. Line 23 contains a filtering means 24, such as a filter screen, and two valves 26 and 27 disposed on either side of the filter. During normal operation, fluid entering tank 11 is passed through filter 24, but when cleaning of the filter becomes necessary, fluid is introduced into tank 11 directly through line 14 by opening valve 22 and closing valves 26 and 27.

Dielectric properties measuring instrument 31 is associated with pipeline 10 and comprises a probe element inserted into the pipeline in order to measure the dielectric properties of fluids flowing therethrough. A more detailed description of this instrument is set out hereinafter in conjunction with the discussion of Figures 2 and 3. Line 32 connected to pipeline 10 leads to the inlet of the sample cell of color monitor 33, also to be described more in detail hereinafter in relation to Figures 4 and 5. The outlet of the color monitor sample cell is connected to pipeline 10 by means of line 34 containing a flow control means such as solenoid valve 35. Line 32 contains a flow control means such as solenoid valve 36, a filtering means 37, similar to filtering means 24, and valves 38 and 39 positioned on either side of the filter. By-pass line 41 containing valve 42 provides means for passing fluid to the color monitor during periods when filter 37 is being cleaned. Pipeline 10 between lines 32 and 34 contains a flow control means such as valve 43, thereby providing means for restricting flow through pipeline 10 and assuring passage of fluid through the sample cell of the color monitor.

The output of dielectric properties measuring instrument 31 is fed to recorder 46 through electrical leads 47. Limit switches 49 and 51 are associated with recorder 46 and are opened and closed in accordance with predetermined values of the dielectric properties measurements. The limit switches are single-pole, single-throw switches and can advantageously be mercury switches which are moved by a cam mechanism which in turn is operatively connected to the recording arm of recorder 46.

The output of color monitor 33 is fed through electrical leads 55 to color monitor control device 52 which includes a single-pole, double-throw switch 53. Switch 53, which can be a micro switch, is moved to either one of two positions in accordance with predetermined values of voltage fed into control device 52 in a manner to be described more in detail hereinafter in conjunction with Figure 5.

The solenoids of valves 35 and 36 are designated by reference numerals 35' and 36' while the coils of motor valves 18, 19 and 21 are indicated by reference numerals 18', 19' and 21', respectively. Coils 35' and 36' are connected to alternating current lines 60 and 60A through switch 49. Coils 18', 19' and 21' of the motor valves are connected to the same source of alternating current through mercury relay switches 61, 62, 63 and 64, which are in turn operated in accordance with the positioning of switches 51 and 53, the coils of the relay switches being connected to the source of alternating current through switches 51 and 53. Signal lights can be connected to the leads supplying current to the coils of the motor valves in order to give a ready indication as to which valve is open and which tank is being used.

While valves 18, 19 and 21 and valves 35 and 36 have been described as being motor valves and solenoid valves, it is not intended to limit the invention to any particular type of flow control means. Accordingly, it is within the scope of the invention to utilize solenoid valves in place of the motor valves, or pneumatic operated diaphragm valves can be used to replace both the motor and solenoid valves.

Figure 2:
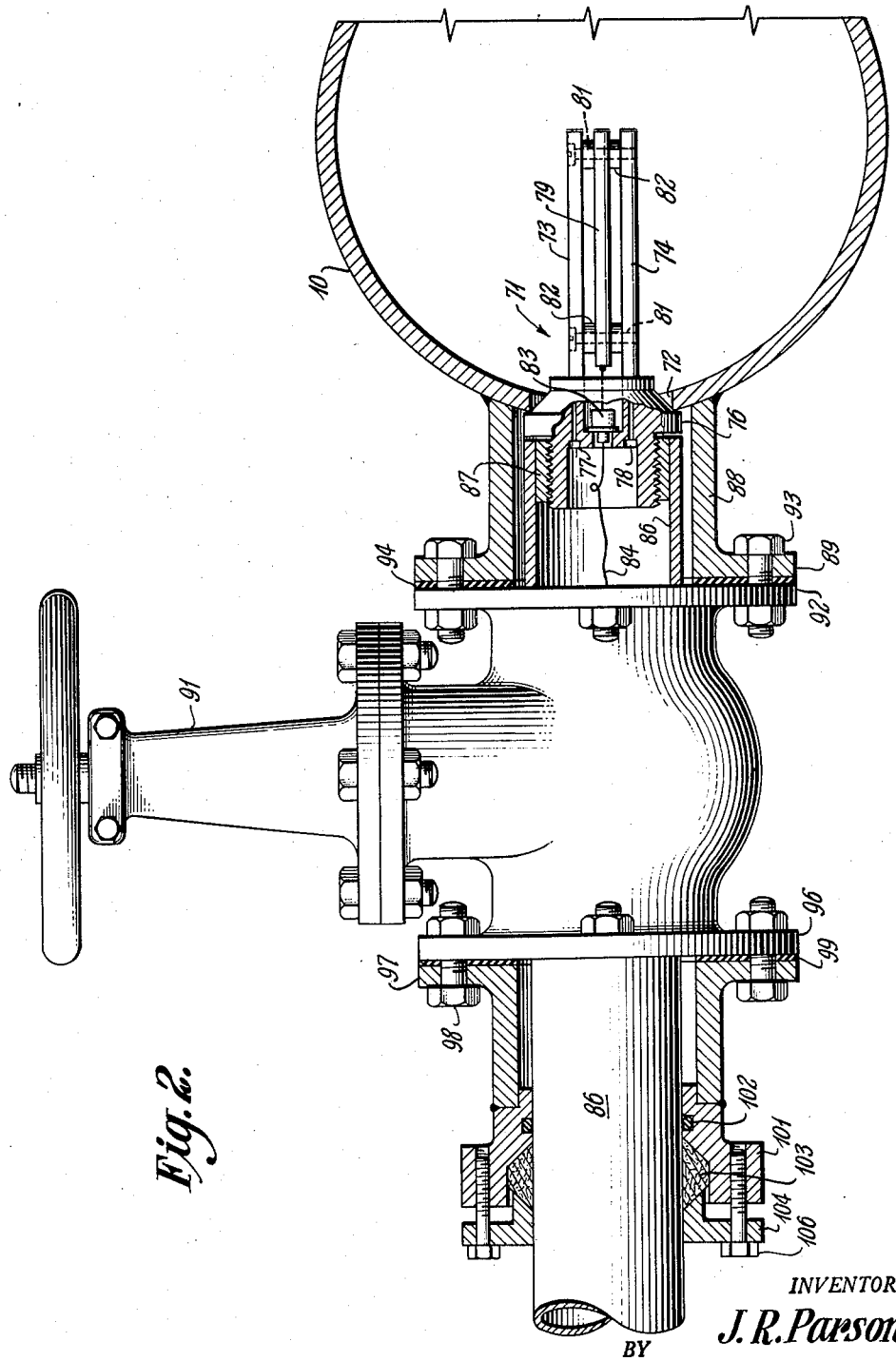
Figure 2 is a view partially in section of a probe element suitable for use in making dielectric measurements.

Referring to Figure 2, there is illustrated a probe element 71 which is suitable for use with dielectric properties measuring instrument 31 of Figure 1. Probe 71 is inserted through an opening 72 in pipeline 10 and comprises a pair of spaced metallic plates 73 and 74 which are attached to a housing plug 76 by screws 77 and 78. A third metallic plate 79 is interposed between plates 73 and 74, screws 81 serving to hold the three plates in spaced relation with one another. These screws pass through insulating plugs 82 which retain plate 79 electrically insulated from plates 73 and 74. An insulator 83 is mounted in plug 76 while an electrical lead 84 passes through insulator 83 to engage plate 79. An elongated cylindrical housing member 86 is attached at one end to plug 76, and a bushing 87 is interposed therebetween.

The capacitance probe unit is conveniently inserted in pipeline 10 through a suitable valve assembly. A nipple 88 is welded to pipeline 10 so as to enclose opening 72. Nipple 88 is formed with a flanged end 89 to which a gate valve 91 having a first annular plate 92 attached thereto is secured by bolts 93. A gasket 94 is interposed between nipple 88 and valve 91. A second annular plate 96 is attached to the second opening of valve 91, this second plate 96 in turn being secured to a flanged nipple 97 by a plurality of bolts 98. A gasket 99 is interposed between nipple 97 and plate 96. An annular packing gland assembly 101 which is welded to the second end of nipple 97 houses an O-ring 102 which engages housing member 86. A quantity of packing material 103 is also contained in assembly 101. A packing retaining plate 104 is attached to the end of packing gland 101 by a plurality of screws 106. By this arrangement the probe element can readily be inserted in pipeline 10 by opening gate valve 91 and when so positioned, packing gland assembly 101 prevents leakage.

Capacitor plates 73, 74 and 79 can be streamlined in order to reduce turbulence in the flowing fluid, thereby enabling a more accurate reading of the dielectric properties of the fluid to be obtained. Plates 73 and 74 are electrically connected to one another through housing plug 76 which is maintained at ground potential. In this manner the outer plates form one capacitor element with respect to the inner plate and shield the inner plate from the effects of metallic pipeline 10. This latter feature also enables a more accurate measurement of the dielectric properties of the fluid to be made.

Figure 3:
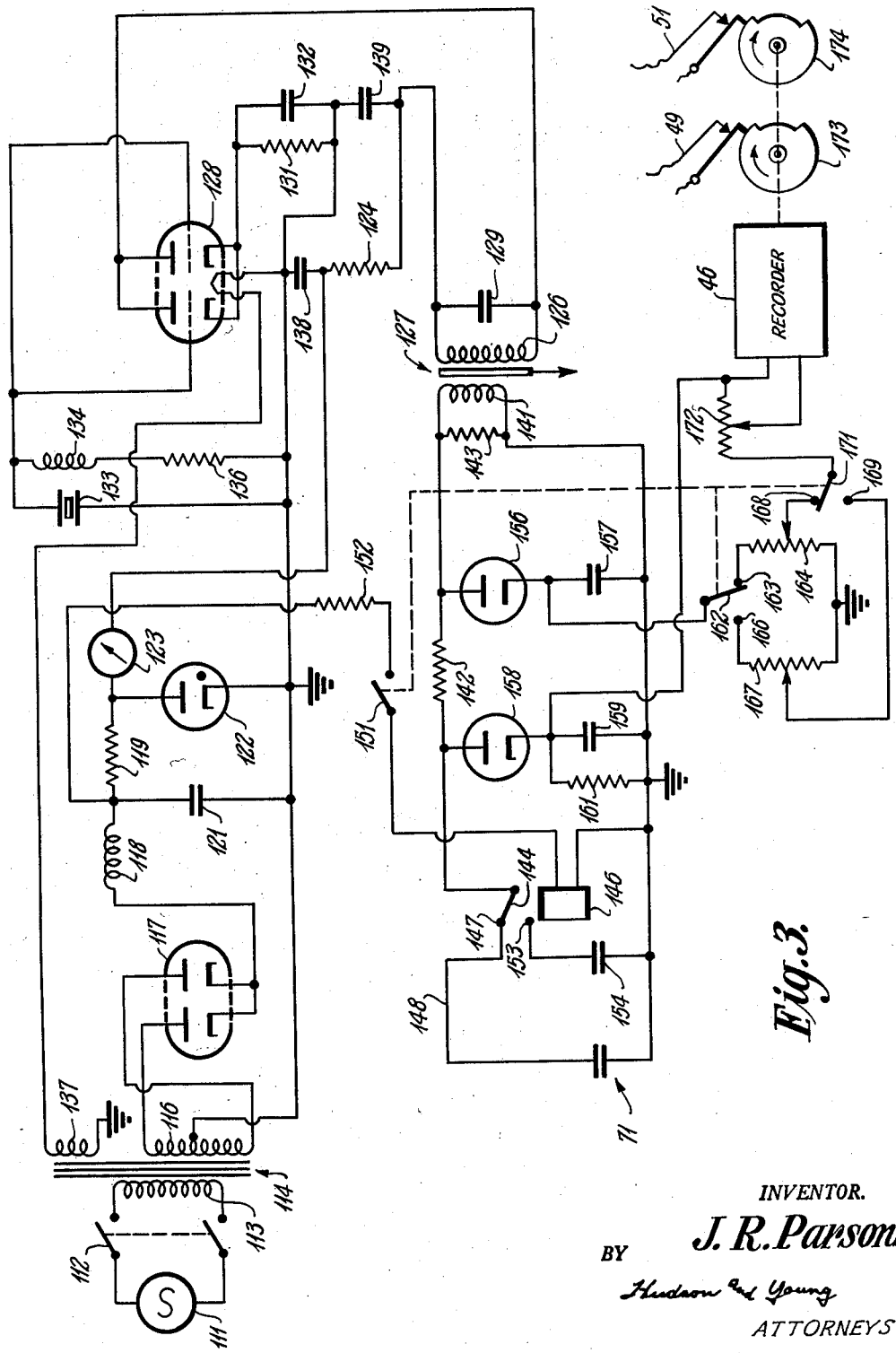
Figure 3 is a schematic circuit diagram of the dielectric properties measuring device of this invention.

Referring to Figure 3, there is illustrated an electrical circuit adapted to measure the capacitance of the condenser elements of probe 71 formed by outer plates 73 and 74 and inner plate 79 as shown in Figure 2. This circuit is energized by a source of alternating current 111 which is connected by switch 112 across the primary winding 113 of a transformer 114. The end terminals of a first secondary winding 116 on transformer 114 are connected to the respective anodes of a double diode 117, the center tap of transformer winding 116 being grounded. The two cathodes of double diode 117 are connected to one another and to one terminal of an inductor 118. The second terminal of inductor 118 is connected to one terminal of a resistor 119, and is grounded through a capacitor 121. A voltage regulator tube 122 has the anode thereof connected to the second terminal of resistor 119 and the cathode thereof connected to ground. The anode of tube 122 is connected through a milliammeter 123 and a resistor 124 to one terminal of the primary winding 126 of a transformer 127. The second end terminal of transformer winding 126 is connected to the anodes of a double vacuum tube triode 128. A capacitor 129 is connected in shunt with transformer winding 126. The cathodes of double triode 128 are connected to one another and to ground through cathode resistor 131 which is shunted by capacitor 132. The control grids of double triode 128 are connected to one another and to one terminal of a crystal 133, the second terminal of crystal 133 being connected to ground. An inductor 134 and a resistor 136 are connected in series relation with one another, the unit of inductor 134 and resistor 136 being connected in shunt with crystal 133. Heater current for double triode 128 is provided by second secondary winding 137 on transformer 114, transformer winding 137 being connected across the common cathode heater of double triode 128. A capacitor 138 is connected between ground and the junction between milliammeter 123 and resistor 124. A capacitor 139 is connected between ground and the junction between resistor 124 and transformer winding 126.

One terminal of the secondary winding 141 of transformer 127 is connected to the first terminal of a resistor 142 and the second end terminal of transformer winding 141 is grounded. A resistor 143 is connected in shunt with transformer winding 141. The second terminal of resistor 142 is connected to a relay operated switch arm 144. In the absence of current being supplied to the relay coil 146 associated with switch arm 144, switch arm 144 normally engages a first contact 147 which is connected by a lead 148 to one of the electrodes of probe 71. One terminal of relay coil 146 is grounded and the second terminal thereof is connected through a switch 151 and a resistor 152 to the junction between resistor 119 and inductor 118. Closure of switch 151 thus results in current being supplied to relay coil 146 which causes switch arm 144 to engage a second contact 153 which is connected to the first terminal of a condenser 154, the second terminal of condenser 154 being grounded. The first terminal of resistor 142 is connected to the anode of a diode 156, and the cathode of diode 156 is connected to ground through a capacitor 157. The second terminal of resistor 142 is connected to the anode of diode 158 and the cathode of diode 158 is connected to ground through a capacitor 159 which is shunted by resistor 161. The junction between diode 156 and capacitor 157 is connected to a switch arm 162. In its first position, switch arm 162 engages a contact 163 which is connected to one end terminal of a potentiometer 164. In its second position, switch arm 162 engages a contact 166 which is connected to one end terminal of a potentiometer 167, the second end terminals of potentiometers 164 and 167 being grounded. The contactor of potentiometer 164 is connected to a switch contact 168, and the contactor of potentiometer 167 is connected to a switch contact 169. A switch arm 171 engages contact 168 in its first position and engages contact 169 in its second position. Switch arm 171 is connected to one end terminal of a potentiometer 172, the contactor of which is connected to one input terminal of a recorder 46. The second input terminal of recorder 46 is connected to the second end terminal of potentiometer 172 and to the cathode of diode 158. Switch arm 151 and switch arms 162 and 171 are mechanically coupled so that when switch 151 is open, switch arm 162 engages contact 163 and switch arm 171 engages contact 168. Lead 148 preferably is contained within a shielded cable if probe 71 is positioned remotely from the remainder of the detecting circuit. Recorder 46 is operatively connected to cams 173 and 174 which are constructed to operate switches 49 and 51 in accordance with predetermined values of capacitance of probe element 71.

In the operation of the circuit illustrated in Figure 3, diode 117 serves as a full wave rectifier. Inductor 118, resistor 119, and capacitor 121 filter the output of diode rectifier 117, and voltage regulating tube 122 maintains a constant positive supply potential for the anode of triode 128. This positive potential is applied to the anodes of double triode 128. Double triode 128 and the circuit elements associated therewith function as an oscillator, the frequency of which is controlled by crystal 133. Milliameter 123 facilitates tuning of the oscillator because a minimum current flows therethrough when the oscillator is tuned to its resonant frequency which preferably is in the radio frequency range. The output of this oscillator is applied through transformer 127, which can be slug tuned, to the bridge circuit which has probe 71 connected therein. The end terminals of transformer winding 141 thereby form output terminals of a source of electrical oscillation.

From an inspection of the circuit illustrated in Figure 3, it can be seen that the voltage across transformer winding 141 is applied across series connected resistor 142 and capacitor 71 which form two arms of the bridge circuit. The other two arms of the bridge circuit comprise the impedance elements formed by the two sections of potentiometer 164 on opposite side of the contactor thereof. Recorder 46 effectively measures the potential difference between the junction of resistor 142 and probe 71 as one point and the contactor of potentiometer 164 as the other point. The purpose of rectifiers 156 and 158 is to convert this bridge unbalance from alternating to direct current to facilitate measurement on direct potential recorder 46. Potentiometer 172 serves to adjust the sensitivity of recorder 46. In operation, the bridge circuit can be balanced initially by adjustment of the contactor of potentiometer 164, and any subsequent deviation from this balance is recorded to provide a measurement of the deviation of the capacitance of probe element 71 from the original value. The electrical circuit can be checked and standardized periodically, if desired, by closure of switch 151. This results in probe 71 being disconnected from the circuit and a standard condenser 154 being connected in place thereof. Closure of switch 151 also results in potentiometer 164 being disconnected and a standard potentiometer 167 being connected in place thereof. If the circuit is operating properly, recorder 46 indicates the fixed value with switch 151 closed. Any deviation from the fixed value indicates that the circuit has changed in some manner and requires readjustment of potentiometer 164.

Figure 4:
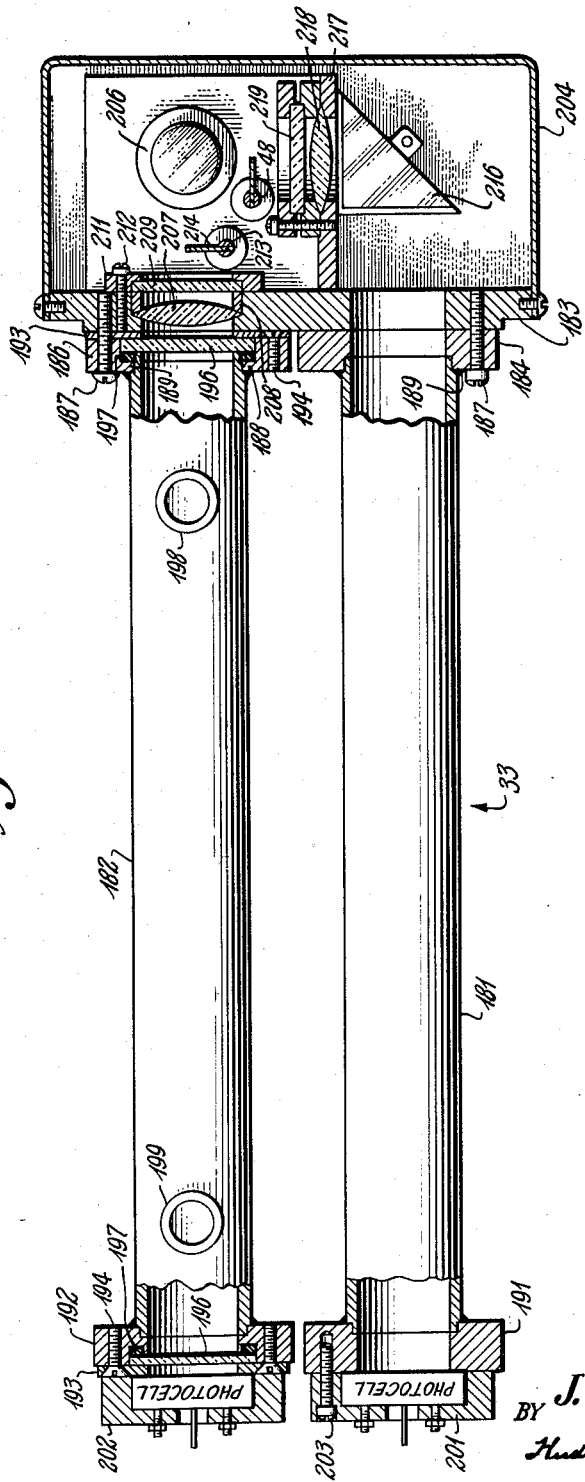
Figure 4 is a view, partially in section, of a color monitor suitable for use in practicing this invention.

Referring to Figure 4, the color monitor 33 includes a pair of elongated, parallel, spaced metal tubes 181 and 182 mounted on and secured to plate 183. To this end, tubes 181 and 182 are welded to a pair of base members 184 and 186 which in turn are suitably secured, as by bolts 187, to plate 183. It is to be noted that tubes 181 and 182 fit into recessed portions 188 and 189 of the respective base members 184 and 186. Plate 183 and base members 184 and 186 have aligned openings formed therein of the same size and in axial alignment with the interior openings of tubes 181 and 182. Base members 191 and 192 secured to the opposite ends of tubes 181 and 182 as by welding also have openings in alignment with the openings in base members 184 and 186 and plate 183.

Each of the base members 186 and 192 is provided with a washer 193 secured to the end thereof remote from tube 182 by bolts 194. Each washer 193 fits also against one surface of a transparent window or disk 196, the other end of which bears against an annular sealing gasket 197 fitted in a suitable recess formed in base members 186 and 192. This structure provides a gastight seal at each end of tube 182 while the transparency of the disk or window 196 permits the passage of radiation therethrough.

Communicating with the interior of tube 182 is a sample inlet 198 and a sample outlet 199 so that the material to be analyzed can be readily inserted into and removed from tube 182.

The optical system associated with tubes 181 and 182 include a pair of radiation detectors 201 and 202. These detectors are preferably photoelectric cells arranged for mounting upon base members 191 and 192, as by bolts, one of which is indicated by reference numeral 203, so as to overlie and cover the tube openings.

Mounted in the housing 204 is a radiation source 206, preferably an incandescent bulb or other source of visible radiation, in alignment with the axis to tube 182. Accordingly, source 206 produces a beam of radiation which passes directly through tube 182 and impinges upon photoelectric cell 202. A lens 207 is secured within a suitable recess in plate 183 by a sleeve 208, and a filter disk 209 abuts sleeve 208, the assembly of lens 207, sleeve 208 and filter 209 being held in assembled position by an end cap 211 secured to plate 183 by bolts, one of which is indicated at 212. A rotatable trimmer 213 positioned within the path of the aforementioned beam includes a movable plate 214 which can be swung into and out of the path of the beam so as to vary its intensity. Lens 207 is provided in order to focus the beam of radiation upon photoelectric cell 202, and filter 209 is preferably made of blue glass. By providing a filter of blue glass, the instrument is given a higher degree of sensitivity.

Also mounted in housing 204 is a prism 216, one end of which abuts an assembly 217 supporting a lens 218 and a filter 219 having similar optical characteristics to filter 209. It will be evident that a second beam of light passes from source 206 through filter 219 and lens 218 to prism 216 whence it is reflected and passes axially along tube 181 to photoelectric cell 201.

Figure 5:
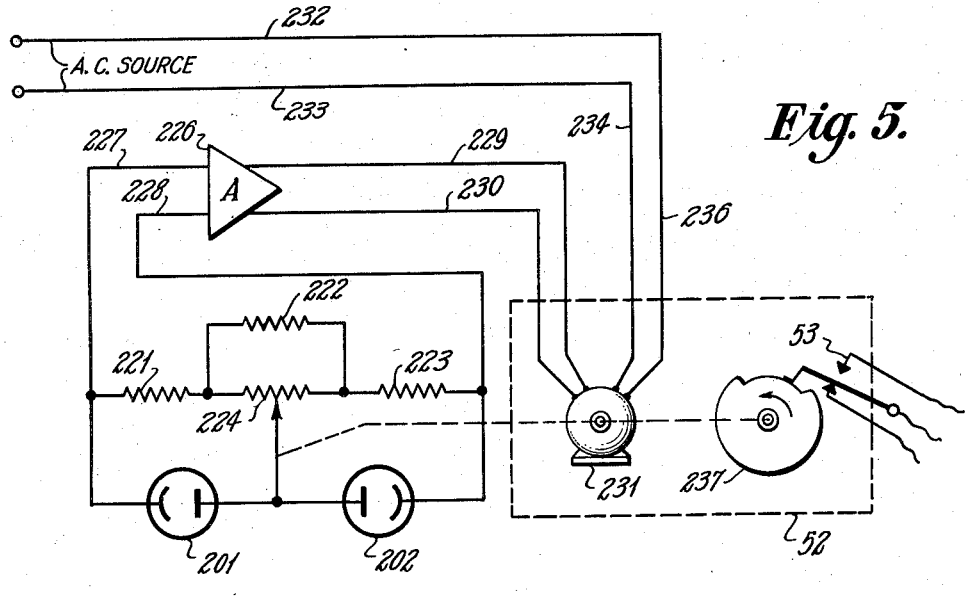
Figure 5 is a schematic circuit diagram of the color monitor of Figure 4.

As illustrated in Figure 5, photoelectric cells 201 and 202 are connected in a bridge circuit with balancing impedances 221, 222 and 223, impedance 222 having a potentiometer 224 connected in parallel therewith. The voltage appearing across two opposite corners of the bridge is fed to the input circuit of an amplifier 226 by leads 227 and 228. If the photo cells are of the self-generating type, as shown, it is unnecessary to provide a current source in the bridge circuit. If the photo cells are not of the self-generating type, then operating potential is supplied to them in any suitable manner. Color monitor control device 52 comprises balancing motor 231, cam 237, and switch 53. The output of amplifier 226 is fed by leads 229 and 230 to one winding of balancing motor 231, the second winding of which is connected to alternating current lines 232 and 233 by leads 234 and 236. The rotor of motor 231 is mechanically connected to the contactor of potentiometer 224 and to cam 237. The connection of motor 231 to the bridge potentiometer is such that the bridge is driven to a balanced position by operation of the motor. Accordingly, the shaft position of motor 231, the position of the potentiometer contactor, and the position of cam 237 all indicate the differential voltage generated by the photoelectric cells. Cam 237 operates to position switch 53 of Figure 1 in accordance with predetermined values of the differential voltage.

In explaining the operation of the monitoring and control system of Figure 1, it is assumed that pipeline 10 is originally transporting clear natural gasoline. During this phase of operation, switches 49, 51 and 53 are in the positions indicated in Figure 1. Relay switch 62 is normally closed while relay switches 61, 63 and 64 are normally open. Current passes through switch 49 to solenoids 35' and 36', thereby energizing them so as to maintain solenoid valves 35 and 36 in an open position. Current also passes through switch 51, energizing the solenoids of relay switches 61 and 62. Since relay switch 62 is normally closed, the energizing of the solenoid of this switch results in the switch being open so that no current is supplied to motor valve coil 21'. Motor valve 21, is, therefore, in a closed position so that fluid cannot enter crude tank 13. The supply of current to the solenoid of relay switch 61 results in that switch, which is normally open, being closed so that current can pass therethrough to switch 53. With switch 53 in the position as shown, current is being supplied to the solenoid of relay switch 63, but not to the solenoid of relay switch 64. Relay switches 63 and 64 being normally open, switch 63 is thereby closed, and current passes only to coil 18' of motor valve 18 while coil 19' of motor valve 19 remains unenergized. Accordingly, motor valve 19 is in a closed position while motor valve 18 is open so as to permit clear natural gasoline to enter tank 11 through lines 14 and 23.

When clear natural gasoline is being transported in pipeline 10, as explained above, dielectric properties measuring instrument 31 operates to maintain switches 49 and 51 in the positions indicated in Figure 1. At the same time, color monitor 33 operates to maintain switch 53 in the position as shown in Figure 1. As illustrated in Figure 3, recorder 46 is operatively connected to a pair of cams 173 and 174 which are moved in accordance with the dielectric properties measurement recorded thereon. Cam 173 is constructed so as to open or close switch 49 while cam 174 is constructed to open or close switch 51, both in accordance with predetermined values of the dielectric properties of the petroleum fluid in pipeline 10. As illustrated in Figure 5, cam 237, which is operatively connected to balancing motor 231, serves to maintain switch 53 in the proper position in accordance with a predetermined value of voltage differential indicated by the detectors.

As previously explained, solenoid valves 35 and 36 of Figure 1 are open thereby permitting clear natural gasoline to pass to the color monitor through line 32 and to be withdrawn therefrom from line 34. Referring to Figures 4 and 5, the fluid enters tube 182 through inlet 198 and is withdrawn therefrom through outlet 199. As the composition of the petroleum stream changes, i. e., becomes contaminated with crude oil, changes in the radiation absorption of the fluid in tube 182 produce an effect upon detector 202 but not upon detector 201. Accordingly, the differential output of detectors 202 and 201 is respresentative of the concentration of crude oil in the natural gasoline stream. Because of the provision of tube 181, changes in intensity resulting from variations in the source voltage affect both detectors and, therefore, minimize the effect on the differential reading. Depending upon the degree of crude oil contamination which can be tolerated, when the difference in light intensity has reached a predetermined value, cam 237 operates to throw switch 53 to the opposite position from that shown in Figure 1. It is assumed now, by way of illustration, that a batch of mixed petroleum liquid containing natural gasoline and some crude oil begins to flow through pipeline 10. The presence of the crude oil in the natural gasoline is immediately determined by the color monitor and when the concentration of crude has reached a predetermined value, as explained above, switch 53 is moved to its opposite position from that shown in Figure 1. Referring again to Figure 1, it is apparent that current now flows through the solenoid of relay switch 64, closing that switch and thereby allowing current to flow to coil 19' of motor valve 19. At the same time, relay switch 63 is opened because of the termination of current supply to its solenoid, and concomitantly the supply of current to coil 18' of motor valve 18 is cut off. Accordingly, motor valve 18 is closed while motor valve 19 is opened, thus permitting natural gasoline contaminated with crude oil to enter dirty natural gasoline tank 12 through line 16.

Referring to Figures 2 and 3 as well as to Figure 1, it is to be understood that the petroleum liquid transported in pipeline 10 is at all times passing through and around probe element 71 of the dielectric properties measuring instrument. It should be apparent that recorder 46 is continuously recording the impedance measurements of the condenser formed by plates 73 and 74 and plate 79 of probe 71 which provides a measurement of the dielectric properties of the petroleum fluid between the plates. It has been found that used alone the dielectric properties measuring instrument is not sufficiently sensitive to detect crude oil in the natural gasoline before the natural gasoline has become contaminated beyond allowable limits. Accordingly, the color monitor is used, as discussed above, in order to obtain the required sensitivity and to detect initially the presence of crude oil. As more crude oil becomes present in the petroleum stream, however, the dielectric properties measuring instrument operates to open switch 49 thereby cutting off the supply of current to the solenoids of solenoid valves 35' and 36' and allowing these valves to close. The closure of valves 35' and 36' terminates the supply of petroleum fluid to color monitor 33, thus preventing dirty material from clouding the optical system of the color monitor. Switch 49 is moved to an open position through the operation of cam 173 which is operatively connected to recorder 46 and so constructed as to open switch 49 when the dielectric properties measurement is of a predetermined value.

The petroleum fluid is allowed to flow into dirty natural gasoline tank 12 until the dielectric properties of that fluid reaches a predetermined value. At that point, cam 174, which is operatively connected to recorder 46, operates to open switch 51. When switch 51 is opened, the solenoids of relay switches 61 and 62 are deenergized, and switch 61 is opened while switch 62 is closed. The opening of switch 61 further cuts off the supply of current to the solenoid of relay switch 64 which is also opened, switch 53 being in an opposite position from that shown in Figure 1 as noted above. Accordingly, current is no longer fed to coil 19' of motor valve 19 with the result that this valve is closed. The closing of relay switch 62 results in current passing to coil 21' of motor valve 21 so that that valve is opened allowing the crude oil to pass into crude tank 13 through line 17.

Figure 6:
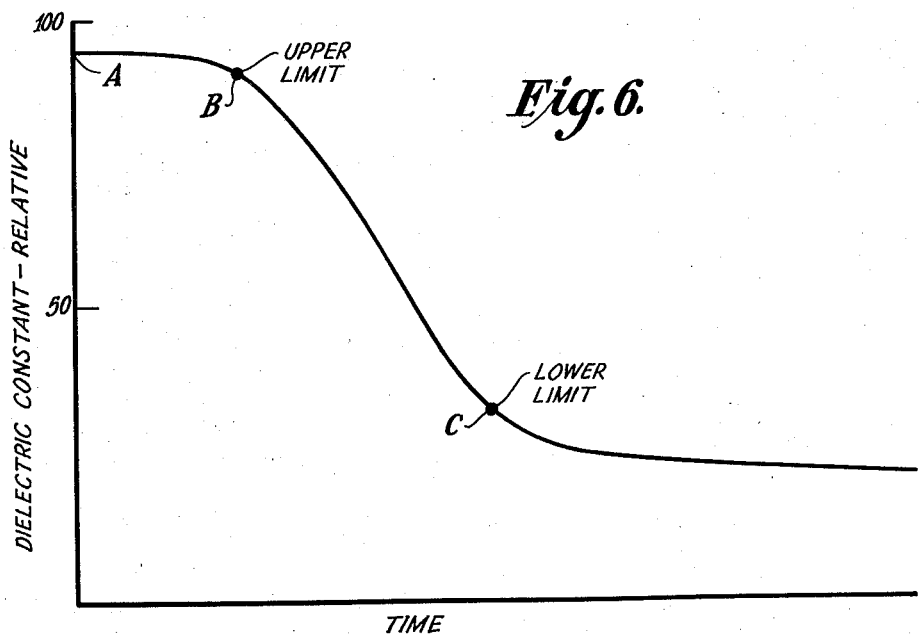
Figure 6 is a graph showing the relation of the dielectric properties measurements during a period of operation.

A better understanding of the above-explained cycle of operation can be obtained by referring to both Figure 1 and Figure 6 which are representations of the curve which might appear on the recorder chart of recorder 46. Initially, pure natural gasoline is passing through pipeline 10 and into clear natural gasoline tank 11 through lines 14 and 23, motor valve 18 being open. When the natural gasoline stream becomes contaminated with crude oil, the color monitor so indicates with the result that motor valve 18 is closed and motor valve 19 is opened in order to permit the natural gasoline contaminated with crude to enter tank 12. This aspect of the operation occurs somewhere between points A and B on the curve, depending upon the predetermined value of concentration of crude oil in the natural gasoline stream as indicated by the dielectric properties measurement. When the dielectric properties measurement reach point B, designated as the upper limit, the dielectric properties measuring instrument operates to open switch 49, thereby terminating the supply of current to solenoids 35' and 36' of solenoid valves 35 and 36, respectively. At this point, therefore, it is apparent that the supply of petroleum fluid to color monitor 33 is terminated. Between points B and C, designated as the lower limit, the petroleum fluid continues to enter dirty natural gasoline tank 12. At point C, the dielectric properties measuring instrument operates to open switch 51 which results in motor valve 19 being closed and motor valve 21 being opened. The petroleum liquid now comprising crude oil passes through line 17 into crude tank 13.

It will be apparent that by utilizing a dielectric properties measuring instrument and a color monitor in a pipeline monitoring and control system, I have provided an effective method for detecting different petroleum fluids flowing in a pipeline. It will be further apparent that by using the dielectric properties measuring instrument and the color monitor in conjunction with one another, I have provided a system which readily detects the difference between pure natural gasoline and natural gasoline diluted with crude oil. Furthermore, I have provided a system which automatically directs the fluids of different compositions to different storage tanks for storage purposes without allowing the products to become contaminated except within allowable or desired limits. While the invention has been explained with reference to the sequence of change from natural gasoline to crude oil, it is to be understood that the described mode of operation is merely reversed when the sequence of operation involves a change from crude oil to natural gasoline. Furthermore, while the pipeline monitoring system of this invention has been described and discussed with relation to a pipeline transporting crude oil and natural gasoline and utilizing three storage tanks, it is not intended to so limit the invention. Accordingly, the system can be used to detect batch changes in other petroleum liquids being transported through a pipeline and to direct the separate batches to a plurality of storage tanks.

As will be evident to those skilled in the art, various modifications of this invention can be made without departing from the spirit or scope of the disclosure.

I claim:

1. A pipeline monitoring and control system which comprises, in combination, a pipeline having connecting lines leading to a series of storage tanks; flow control means in each of said connecting lines; means associated with said pipeline for detecting changes in the color of a fluid flowing therethrough; means associated with said pipeline for measuring the dielectric properties of a fluid flowing therethrough; and means for regulating said flow control means in accordance with detected changes in color of said fluid and in accordance with dielectric properties measurement of said fluid.

2. A pipeline monitoring and control system which comprises, in combination, a pipeline; a series of storage tanks communicating with said pipeline; color detection means communicating with said pipeline; means associated with said pipeline for measuring the dielectric properties of a liquid flowing therethrough; and switching means for connecting and disconnecting said storage tanks in accordance with a predetermined response of said color detection means and in accordance with a predetermined dielectric properties measurement.

3. A pipeline monitoring and control system which comprises, in combination, a pipeline, a series of storage tanks communicating with said pipeline, color detection means communicating with said pipeline; means associated with said pipeline for measuring the dielectric properties of a liquid flowing therethrough; switching means for connecting at least one of said storage tanks to said pipeline and for disconnecting at least one other of said storage tanks from said pipeline in accordance with a predetermined response of said color detection means; and switching means for connecting at least one of said storage tanks to said pipeline and for disconnecting at least one other of said storage tanks from said pipeline in accordance with a predetermined dielectric properties measurement.

4. A pipeline monitoring and control system which comprises, in combination, a pipeline; a series of storage tanks, conduit means connecting each of said storage tanks with said pipeline; valve means in each of said conduit means; color detection means communicating with said pipeline; means associated with said pipeline for measuring the dielectric properties of a liquid flowing therethrough; switching means for opening at least one of said valve means and for closing at least one other of said valve means in accordance with a predetermined response of said color detection means; and switching means for opening at least one of said valve means and for closing at least one other of said valve means in accordance with a predetermined dielectric properties measurement.

5. A pipeline monitoring and control system which comprises, in combination, a pipeline; a series of three storage tanks; conduit means connecting each of said storage tanks with said pipeline; first, second and third valve means, one of said valve means being in each of said conduit means; color detection means communicating with said pipeline; means associated with said pipeline for measuring the dielectric properties of a liquid flowing therethrough; switching means for opening and closing said first and second valve means in accordance with a predetermined response of said color detection means; and switching means for opening and closing said second and third valve means in accordance with a predetermined dielectric properties measurement.

6. A pipeline monitoring and control system which comprises, in combination, a pipeline; a series of three storage tanks; conduit means connecting each of said storage tanks with said pipeline; first, second and third valve means, one of said valve means being in each of said conduit means; color detection means; conduit means communicating said color detection means with said pipeline; fourth valve means in said last-mentioned conduit means; means associated with said pipeline for measuring the dielectric properties of a fluid flowing therethrough; first switching means for opening and closing said first and second valve means in accordance with a predetermined response of said color detection means; second switching means for opening and closing said fourth valve means in accordance with a predetermined dielectric properties measurement; and third switching means for opening and closing said second and third valve means in accordance with a predetermined dielectric properties measurement.

7. A pipeline monitoring and control system which comprises, in combination, a pipeline having connecting lines leading to a series of three storage tanks; a source of alternating current; first, second, and third motor valves, each having a coil connected across said source of alternating current and one of said valves being in each of said connecting lines; color detection means; a first conduit means for passing fluid from said pipeline to said color detection means; a second conduit means for passing fluid from said color detection means to said pipeline; a solenoid valve in each of said first and second conduit means, each having a solenoid connected across said source of alternating current; means associated with said pipeline for measuring the dielectric properties of a fluid flowing therethrough; first switching means for controlling current flow to the coils of said first and second motor valves in accordance with a predetermined response of said color detection means; second switching means for controlling current flow to the solenoids of said solenoid valves in accordance with a predetermined dielectric properties measurement; and third switching means for controlling current flow to the coils of said second and third motor valves in accordance with a predetermined dielectric properties measurement.

8. A pipeline monitoring and control system which comprises, in combination, a pipeline; a series of three storage tanks; conduit means connecting each of said storage tanks with said pipeline; first, second and third motor valves, one of said valves being in each of said conduit means; color detection means; conduit means communicating said color detection means with said pipeline, a solenoid valve in said last-mentioned conduit means; means associated with said pipeline for measuring the dielectric properties of a fluid flowing therethrough; a source of alternating current; first switching means connecting the coils of said first and second motor valves to said source of alternating current; means for actuating said first switching means in accordance with a predetermined response of said color detection means; second switching means connecting the solenoid of said solenoid valve to said source of alternating current; means for actuating said second switching means in accordance with a predetermined dielectric properties measurement; third switching means connecting the coils of said second and third motor valves to said source of alternating current; and means for actuating said third switching means in accordance with a predetermined dielectric properties measurement.

9. A pipeline monitoring and control system which comprises, in combination, a pipeline; a series of three storage tanks; conduit means connecting each of said storage tanks with said pipeline; first, second and third motor valves, one of said valves being in each of said conduit means; color detection means; conduit means communicating said color detection means with said pipeline; a solenoid valve in said last-mentioned conduit means; means associated with said pipeline for measuring the dielectric properties of a fluid flowing therethrough; a source of alternating current having a first and second terminal; first switching means connecting said first terminal to one end of the solenoid of said solenoid valve; means connecting said second terminal to the other end of said solenoid; second switching means connecting said first terminal to one end of the coils of said first and second motor valves; means connecting the other end of said last-mentioned coils to said second terminal; second switching means connecting said first terminal to one end of the coils of said second and third motor valves; means connecting the other end of the coil of said third motor valve to said second terminal; means for actuating said first switching means in accordance with a predetermined dielectric properties measurement; means for actuating said second switching means in accordance with a predetermined dielectric properties measurement; and means for actuating said third switching means in accordance with a predetermined response of said color detection means.

10. A pipeline monitoring and control system which comprises, in combination, a pipeline; a series of three storage tanks; conduit means connecting each of said storage tanks with said pipeline; first, second and third motor valves, one of said valves being in each of said conduit means; color detection means; conduit means communicating said color detection means with said pipeline; a solenoid valve in said last-mentioned conduit means; means associated with said pipeline for measuring the dielectric properties of a fluid flowing therethrough; a source of alternating current having a first and a second terminal; first switching means connecting said first terminal to one end of the solenoid of said solenoid valve; means connecting said second terminal to the other end of the solenoid of said solenoid valve; means connecting said first terminal to one contact of a normally-closed relay switch; means connecting the other contact of said normally-closed relay switch to one end of the coil of said first motor valve; means connecting said second terminal to the other end of the coil of said first motor valve; means connecting said first terminal to one contact of a first normally-open relay switch; second switching means connecting said first terminal to one end of the coils of said normally-closed relay switch and said first normally-open relay switch; means connecting said second terminal to the other end of said last-mentioned coils; means connecting said first terminal to one contact of a second normally-open relay switch; means connecting said first terminal to one contact of a third normally-open relay switch; third switching means connecting the other contact of said first normally-open relay switch to the coils of said second and third normally-open relay switches; means connecting said second terminal to said last-mentioned coils; means connecting the other contact of said second relay switch to one end of the coil of said second motor valve; means connecting the other contact of said third normally-open relay switch to one end of the coil of said third motor valve; means connecting said second terminal to the other ends of the coils of said second and third motor valves; means for actuating said first switching means in accordance with a predetermined dielectric properties measurement; means for actuating said second switching means in accordance with a predetermined dielectric properties measurement; and means for actuating said third switching means in accordance with a predetermined response of said color detection means.

11. A pipeline monitoring and control system which comprises, in combination a pipeline; a series of three storage tanks; conduit means connecting each of said storage tanks with said pipeline; first, second and third valve means, one of said valve means being in each of said conduit means; a color monitor comprising a sample cell and a standard cell, said sample cell having an outlet and an inlet, a line containing a solenoid valve connecting said inlet to said pipeline, a source of visible light, a pair of photoelectric cells, means for passing beams of light from said source through said sample cell and said standard cell to said photoelectric cells, a pair of balancing impedances, means connecting said balancing impedances in a bridge circuit with said photoelectric cells, amplifying means, means connecting two opposite corners of said bridge circuit to the input circuit of said amplifying means, and means connecting the output circuit of said amplifying means to a balancing motor having field windings connected to a source of alternating current, said motor being adapted to balance said bridge; a dielectric properties measuring instrument comprising a pair of spaced electrodes positioned within said pipeline, a source of electrical oscillations, a first impedance element connected in series relation with the condenser formed by said spaced electrodes, means for applying said source of oscillations across said series connected first impedance element and said condenser, second and third impedance elements connected in series relation, means for applying said source of oscillations across said series connected second and third impedance elements, direct current indicating means, and current rectifying means connecting said direct current indicating means between the junction between said first impedance element and said condenser and the junction of said second and third impedance elements; first switching means connecting the coils of said first and second motor valves to said source of alternating current; means operatively connected to said balancing motor for actuating said first switching means; second switching means connecting the solenoid of said solenoid valve to said source of alternating current; means operatively connected to said direct current indicating means for actuating said second switching means; third switching means connecting the coils of said second and third motor valves to said source of alternating current; and means operatively connected to said direct current indicating means for actuating said third switching means.

12. In a method of pipeline monitoring and control wherein petroleum liquids of different composition are passed to preselected storage chambers, the improvement which comprises flowing a petroleum liquid into a first storage chamber; measuring the dielectric properties of said flowing liquid; detecting any change in the color of said flowing liquid; diverting the flow of said liquid from said first storage chamber to a second storage chamber in accordance with a predetermined color change; and diverting the flow of said liquid from said second storage chamber to a third storage chamber when said dielectric properties measurement reaches a predetermined value.

References Cited in the file of this patent

UNITED STATES PATENTS

| | | |
|---|---|---|
| 1,145,509 | Pike et al. | July 6, 1915 |
| 2,066,934 | Gulliksen | Jan. 5, 1937 |
| 2,605,780 | Nance | Aug. 5, 1952 |